(12) United States Patent
Keymolen

(10) Patent No.: US 11,347,647 B2
(45) Date of Patent: May 31, 2022

(54) ADAPTIVE CACHE COMMIT DELAY FOR WRITE AGGREGATION

(71) Applicant: Western Digital Technologies, Inc., San Jose, CA (US)

(72) Inventor: Bruno Keymolen, Ghent (BE)

(73) Assignee: Western Digital Technologies, Inc., San Jose, CA (US)

( * ) Notice: Subject to any disclaimer, the term of this patent is extended or adjusted under 35 U.S.C. 154(b) by 41 days.

(21) Appl. No.: 16/223,662

(22) Filed: Dec. 18, 2018

(65) Prior Publication Data

US 2020/0192805 A1 Jun. 18, 2020

(51) Int. Cl.
*G06F 12/0871* (2016.01)
*G06F 3/06* (2006.01)

(52) U.S. Cl.
CPC ........ *G06F 12/0871* (2013.01); *G06F 3/0604* (2013.01); *G06F 3/067* (2013.01); *G06F 3/0647* (2013.01)

(58) Field of Classification Search
None
See application file for complete search history.

(56) References Cited

U.S. PATENT DOCUMENTS

| | | | | |
|---|---|---|---|---|
| 7,165,129 B1* | 1/2007 | Okmianski | ......... | G06F 12/0868 710/52 |
| 9,009,742 B1* | 4/2015 | Fair | ....................... | G06F 3/0664 719/330 |
| 9,135,123 B1* | 9/2015 | Armangau | ............ | G06F 16/172 |
| 9,269,376 B1* | 2/2016 | Hess | ................ | G11B 20/10527 |
| 9,614,926 B2 | 4/2017 | Gunda et al. | | |
| 9,690,703 B1* | 6/2017 | Jess | .......................... | G06F 12/08 |
| 9,785,518 B2 | 10/2017 | Kanteti et al. | | |
| 2003/0212865 A1 | 11/2003 | Hicken et al. | | |
| 2004/0117441 A1* | 6/2004 | Liu | ..................... | G06F 12/0888 709/203 |
| 2010/0257307 A1* | 10/2010 | Chu | .................... | G06F 12/0804 711/103 |
| 2011/0258391 A1* | 10/2011 | Atkisson | ............... | G06F 11/108 711/118 |
| 2012/0047332 A1* | 2/2012 | Bannon | ............... | G06F 12/0804 711/135 |
| 2012/0284544 A1* | 11/2012 | Xian | .................... | G06F 12/0804 713/320 |
| 2016/0077798 A1* | 3/2016 | Pradeep | .................. | H04L 67/28 710/53 |
| 2016/0085674 A1* | 3/2016 | Sterns | .................. | G06F 12/0804 711/143 |
| 2016/0283116 A1* | 9/2016 | Ramalingam | ......... | G06F 3/0688 |

\* cited by examiner

*Primary Examiner* — Sanjiv Shah
*Assistant Examiner* — Alexander J Yoon
(74) *Attorney, Agent, or Firm* — Patent Law Works LLP

(57) ABSTRACT

Example storage systems, file system interfaces, and methods provide cache commit timing management for aggregated writes. A system includes a data cache configured to aggregate data requests in buffer segments. A cache manager determines a delay threshold for each buffer based on usage values of the data cache. The cache manager monitors a commit time value, determines when the commit time value satisfies the delay threshold, and moves aggregate data elements from the buffer to persistent storage.

20 Claims, 9 Drawing Sheets

ADAPTIVE CACHE COMMIT DELAY FOR WRITE AGGREGATION

TECHNICAL FIELD

The present disclosure generally relates to data storage, and in a more particular example, to distributed data storage systems.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store data objects referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

These large-scale storage systems may need to interface with a variety of systems, platforms, and applications, some of which may not include native support for object storage. As such, file system interfaces have been developed to enable systems based on alternate storage protocols, such as network file system (NFS) protocol, to benefit from storing data in a back-end large-scale storage system. In addition to object storage systems, other distributed storage systems may use storage paradigms that do not directly map to the file systems of client systems and may utilize some level of metadata and indirection to map between file data and backend storage data.

Distributed storage systems may benefit from read/write caching to improve efficiency and reduce latency in data requests. Caching may also be beneficial for supporting indirection between file data protocols and backend storage locations and paradigms. In particular, write caching may be beneficial for aggregating smaller data elements handled by one storage protocol, such as an NFS protocol, into larger data elements preferred by a second protocol, such as an object storage protocol.

Efficient use of cache space and the timing of moving cached writes from the cache to persistent storage may be a relevant performance parameter for such systems. Leaving a partially filled cache space open for too long in hopes of filling it may degrade system performance and increase cache requirements, while committing too many partial cache data elements may increase fragmentation and interface bandwidth use, as well as impact the efficiency of the persistent storage system.

Efficient implementations for managing cache commit timing may be needed. A need exists for at least improved cache commit timing for write aggregation cache, such as write cache used for indirection in storage protocol interface systems.

SUMMARY

Various aspects for improved cache commit timing, particularly, adaptive cache commit delay for aggregate write cache in distributed storage systems are described.

One general aspect includes a system including a data cache configured to aggregate a plurality of file data requests in at least one buffer segment in the data cache and a cache manager. The cache manager is configured to: determine, based on at least one usage value, a delay threshold for the at least one buffer segment; monitor a commit time value for the at least one buffer segment after a first file data element is stored in the at least one buffer segment; determine, based on the commit time value satisfying the delay threshold, a data commit trigger for the at least one buffer segment; and move, responsive to the data commit trigger, aggregate data elements from the at least one buffer segment to a persistent storage medium.

Implementations may include one or more of the following features. The system may also include a file server configured to manage the plurality of file data requests, where the plurality of file data request are received from at least one client system using a file system protocol. The system may also include a persistent storage interface configured to store, responsive to the cache manager, aggregate data elements to the persistent storage medium. The aggregate data elements may be from the at least one buffer segment, the data cache may include a plurality of buffer segments that include the at least one buffer segment, and each buffer segment from the plurality of buffer segments may have a buffer size corresponding to a preferred persistent data element size. The cache manager may be further configured to aggregate file data requests received by the file server in the plurality of buffer segments and determine, based on aggregate data elements exceeding a usage target for the plurality of buffer segments, the data commit trigger, where the usage target is based on the preferred persistent data element size. The cache manager may be further configured to determine a percentage of writes to the persistent storage medium with aggregate data elements that exceed a usage target for the data cache, where the at least one usage value includes the percentage of writes. The usage target may be based on a preferred persistent data element size for the persistent storage medium. Determining the delay threshold may further include: determining a default delay threshold; determining that the at least one usage value is less than a usage target; and applying, responsive to determining that the at least one usage value is less than the usage target, an adaptation algorithm to the default delay threshold to determine the delay threshold. Determining the delay threshold may further include iteratively applying, responsive to determining that the at least one usage value is less than the usage target, the adaptation algorithm to a prior delay threshold to determine the delay threshold. The adaptation algorithm may iteratively increment the delay threshold along a curve indexed by the prior threshold until a maximum delay threshold is reached. The data cache may include a plurality of buffer segments, including the at least one buffer segment. The plurality of file data requests may correspond to a plurality of logical data groups and each buffer segment from the plurality of buffer segments may aggregate file data requests corresponding to a selected logical data group. The cache manager may be further configured to: monitor at least one usage value for each of the plurality of logical data groups; aggregate file data requests received by a file server in the plurality of buffer segments; and determine, based on the at least one usage value for each of the plurality of logical data groups, a group delay threshold for each of the plurality of logical data groups, where determining the delay threshold for the at least one buffer segment includes selecting, based on the selected logical data group corresponding to aggregate data elements in the at least one buffer segment, the delay threshold from a corresponding group delay threshold.

Another general aspect includes a computer-implemented method including: aggregating a plurality of data requests in at least one buffer segment in a data cache; determining, based on at least one usage value, a delay threshold for the at least one buffer segment; monitoring a commit time value for the at least one buffer segment after a first data element is stored in the at least one buffer segment; determining, based on the commit time value satisfying the delay threshold, a data commit trigger for the at least one buffer segment; and moving, responsive to the data commit trigger, aggregate data elements from the at least one buffer segment to a persistent storage node.

Implementations may include one or more of the following features. The computer-implemented method may further include managing the plurality of data requests, where: the plurality of data request are received from at least one client system using a file system protocol; the persistent storage node has a preferred persistent data element size; the data cache includes a plurality of buffer segments that include the at least one buffer segment; and each buffer segment from the plurality of buffer segments has a buffer size corresponding to the preferred persistent data element size. The computer-implemented method may further include aggregating data requests in the plurality of buffer segments and determining, based on aggregate data elements exceeding a usage target for the plurality of buffer segments, the data commit trigger, where the usage target is based on the preferred persistent data element size. The computer-implemented method may further include determining a percentage of writes to the persistent storage node with aggregate data elements that exceed a usage target for the data cache, where the at least one usage value includes the percentage of writes. The usage target may be based on a preferred persistent data element size for the persistent storage node. The computer-implemented method further including: determining a default delay threshold; determining that the at least one usage value is less than a usage target; and applying, responsive to determining that the at least one usage value is less than the usage target, an adaptation algorithm to the default delay threshold to determine the delay threshold. The computer-implemented method may further include iteratively applying, responsive to determining that the at least one usage value is less than the usage target, the adaptation algorithm to a prior delay threshold to determine the delay threshold. The adaptation algorithm may iteratively increment the delay threshold along a curve indexed by the prior threshold until a maximum delay threshold is reached. The data cache may include a plurality of buffer segments, including the at least one buffer segment, where the plurality of data requests correspond to a plurality of logical data groups and each buffer segment from the plurality of buffer segments aggregates file data requests corresponding to a selected logical data group. The computer-implemented method may also include: monitoring at least one usage value for each of the plurality of logical data groups; aggregating data requests in the plurality of buffer segments; and determining, based on the at least one usage value for each of the plurality of logical data groups, a group delay threshold for each of the plurality of logical data groups, where determining the delay threshold for the at least one buffer segment includes selecting, based on the selected logical data group corresponding to aggregate data elements in the at least one buffer segment, the delay threshold from a corresponding group delay threshold.

Another general aspect includes a system including a data cache configured to aggregate a plurality of data requests in at least one buffer segment in the data cache and a storage node configured to store aggregate data elements from the data cache in a persistent storage medium. The system also includes: means for determining, based on at least one usage value, a delay threshold for the at least one buffer segment; means for monitoring a commit time value for the at least one buffer segment after a first write request stores a first data element in the at least one buffer segment; means for determining, based on the commit time value satisfying the delay threshold, a data commit trigger for the at least one buffer segment; and means for moving, responsive to the data commit trigger, aggregate data elements from the at least one buffer segment to the persistent storage medium.

Implementations may include one or more of the following features. The system may further include means for determining a percentage of writes to the storage node with aggregate data elements that exceed a usage target for the data cache, where the at least one usage value includes the percentage of writes and the usage target is based on a preferred persistent data element size for the storage node. The means for determining the delay threshold may be configured to: determine a default delay threshold; determine that the at least one usage value is less than a usage target; and apply, responsive to determining that the at least one usage value is less than the usage target, an adaptation algorithm to the default delay threshold to determine the delay threshold. The means for determining the delay threshold may be further configured to iteratively apply, responsive to determining that the at least one usage value is less than the usage target, the adaptation algorithm to a prior delay threshold to determine delay threshold.

The various embodiments advantageously apply the teachings of distributed storage networks and/or systems to improve the functionality of such computer systems. The various embodiments include operations to overcome or at least reduce the issues in the previous storage networks and/or systems discussed above and, accordingly, are more reliable and/or efficient than other computing networks. That is, the various embodiments disclosed herein include hardware and/or software with functionality to improve the handling of cache commit timing for aggregate write cache in storage systems, such as by using adaptive cache commit delays for moving aggregate data elements from cache to persistent storage. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
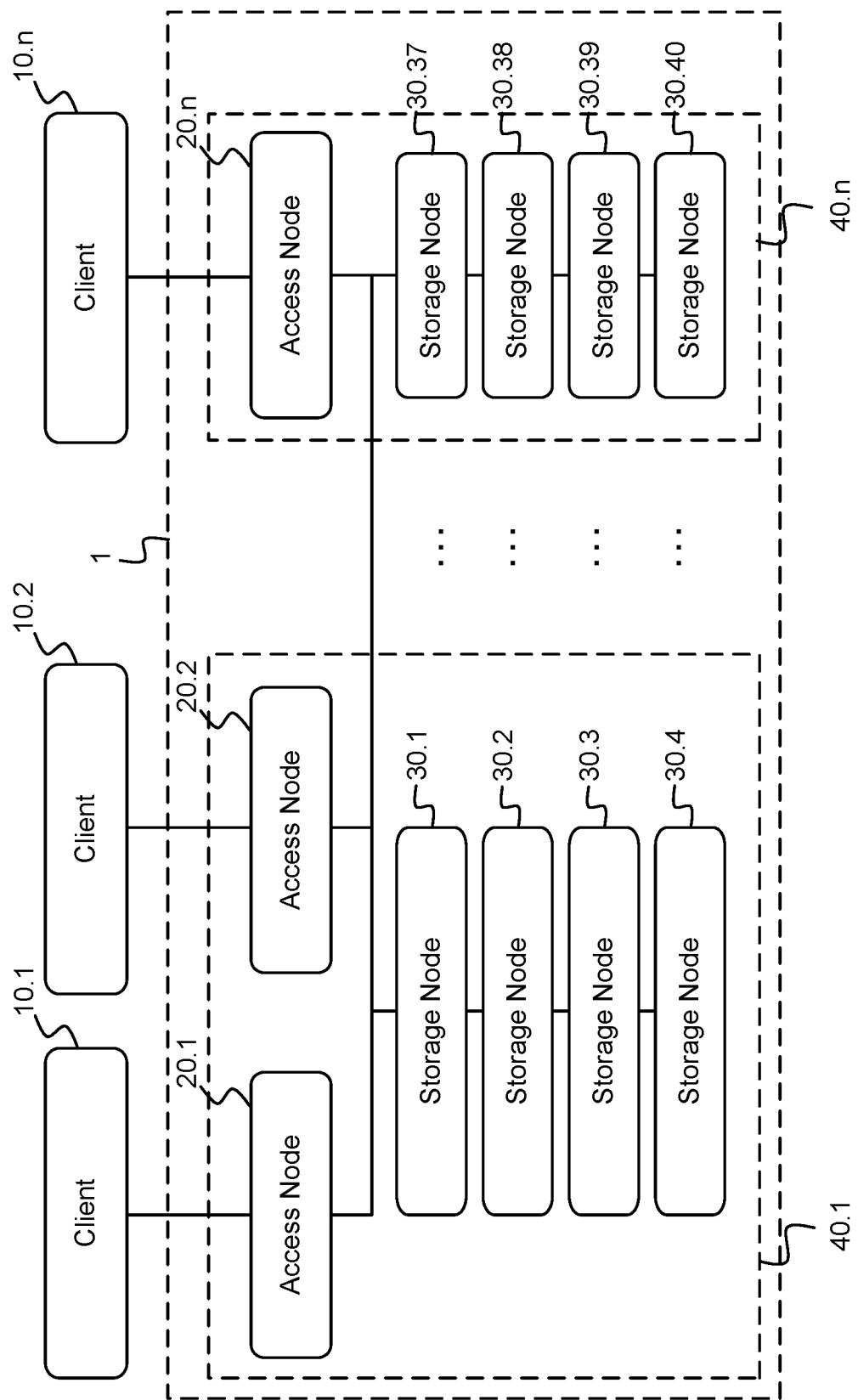
FIG. 1 schematically illustrates an example of a distributed storage system.

FIG. 1 shows an embodiment of an example distributed storage system 1. In some embodiments, the distributed storage system 1 may be implemented as a distributed object storage system which is coupled to one or more clients 10.1-10.n for accessing data objects through one or more access nodes 20.1-10.n. The connection between the distributed storage system 1 and clients 10 could, for example, be implemented as a suitable data communication network. Clients 10 may host or interface with one or more applications that use data stored in distributed storage system 1. Such an application could, for example, be a dedicated software application running on a client computing device, such as a personal computer, a laptop, a wireless telephone, a personal digital assistant or any other type of communication device that is able to interface directly with the distributed storage system 1. However, according to alternative embodiments, the applications could, for example, comprise a suitable file system which enables a general purpose software application to interface with the distributed storage system 1, an application programming interface (API) library for the distributed storage system 1, etc. In some embodiments, access nodes 20 may include a file interface system for receiving file data requests from clients 10 according to a file system protocol and access data in storage nodes 30.1-30.40 using a different storage protocol, such as an object storage protocol.

Clients 10 may include computing devices and/or systems running applications compatible with one or more file systems that manage data and data access through files, directories, volumes, devices, and/or similar logical structures for mapping data units to physical storage locations. For example, clients 10 may include file system clients configured with a file system protocol, such as the network file system (NFS) protocols, sever message block (SMB) protocols, file allocation table (FAT) protocols, Hadoop distributed file system (HDFS) protocols, Google file system (GFS) protocols, etc.

As further shown in FIG. 1, the distributed storage system 1 comprises a plurality of access nodes 20 and a plurality of storage nodes 30 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Access nodes 20, storage nodes 30 and the computing devices comprising clients 10 may connect to the data communication network by means of suitable wired, wireless, optical, etc. network connections or any suitable combination of such network connections. Although the embodiment of FIG. 1 shows only three access nodes 20 and forty storage nodes 30, according to alternative embodiments the distributed storage system 1 could comprise any other suitable number of storage nodes 30 and, for example, two, three or more access nodes 20 coupled to these storage nodes 30.

These access nodes 20 and storage nodes 30 may be built as general-purpose computers. Alternatively, they may be physically adapted for arrangement in large data centers, where they are arranged in modular racks 40.1-40.n comprising standard dimensions. Exemplary access nodes 20 and storage nodes 30 may be dimensioned to take up a single unit of such racks 40, which is generally referred to as 1U. Such an exemplary storage node may use a low-power processor and may be equipped with ten or twelve high capacity serial advanced technology attachment (SATA) disk drives and is connectable to the network over redundant Ethernet network interfaces. An exemplary access node 20 may comprise high-performance servers and provide network access to clients 10 over multiple high bandwidth Ethernet network interfaces. Data can be transferred between clients 10 and such access nodes 20 by means of a variety of network protocols including hypertext transfer protocol (HTTP)/representational state transfer (REST) object interfaces, language-specific interfaces such as Microsoft.Net, Python or C, etc. Additionally, such access nodes may comprise additional high bandwidth Ethernet ports to interface with the storage nodes 30. In some embodiments, HTTP/REST protocols complying with the Amazon Simple Storage Service (S3) object storage service may enable data transfer through a REST application protocol interfaces (API). Such access nodes 20 may operate as a highly available cluster of controller nodes with one or more integrated and/or independent interface systems, and provide for example shared access to the storage nodes 30, metadata caching, protection of metadata, etc.

As shown in FIG. 1 several storage nodes 30 can be grouped together, for example because they are housed in a single rack 40. For example, storage nodes 30.1-30.4 and 30.7-30.40 each are respectively grouped into racks 40.1 and 40.n. Access nodes 20 may be located in the same or different racks as the storage nodes to which the access nodes connect. A rack may have multiple access nodes, for example rack 40.1, a single access node as rack 40.n, or no access nodes (not shown) and rely on an access node in another rack or storage nodes or clients with built-in access node and/or controller node capabilities. These racks are not required to be located at the same location, they are often geographically dispersed across different data centers, such as for example rack 40.1-40.3 can be located at a data center in Europe, 40.4-40.7 at a data center in the USA and 40.8-40.10 at a data center in China.

Figure 2:
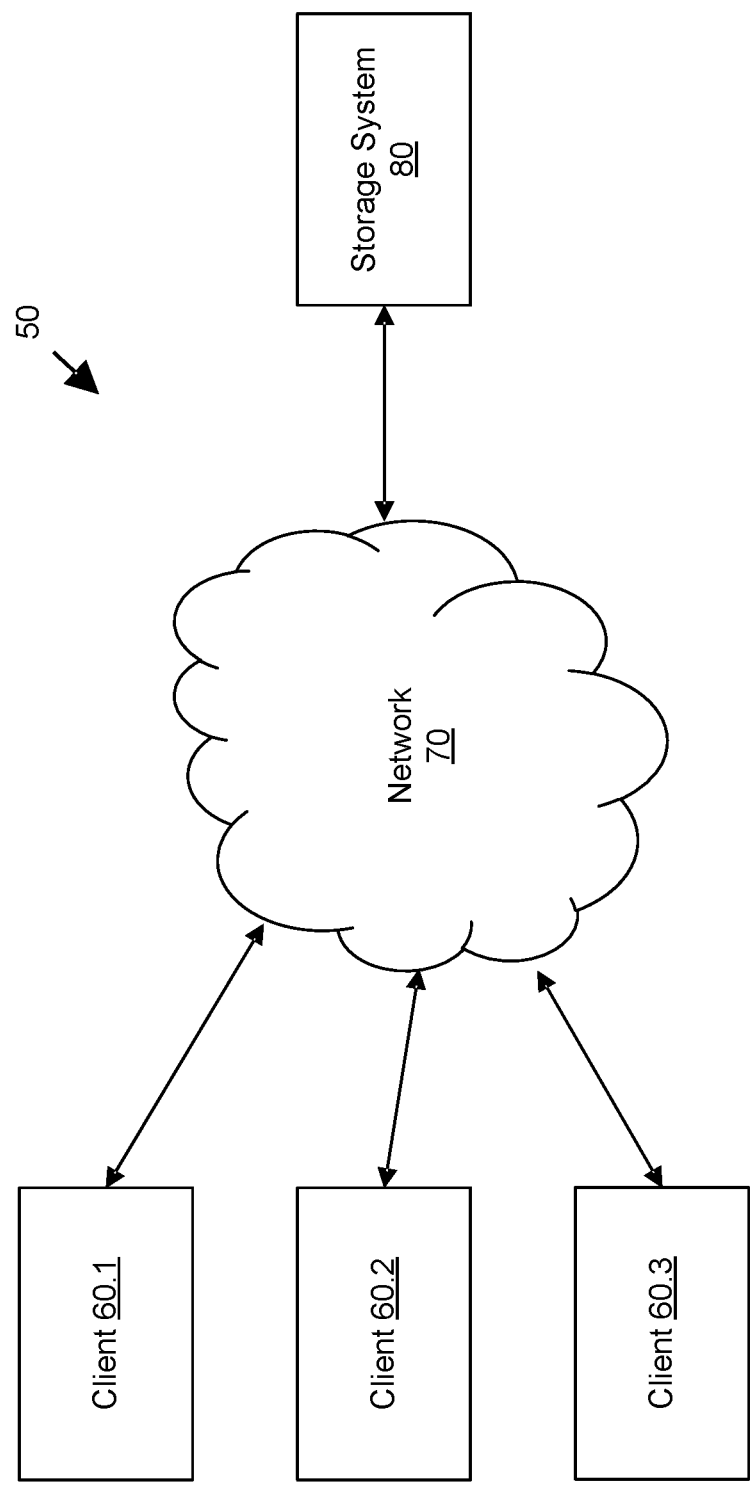
FIG. 2 schematically illustrates an example client architecture in which the distributed storage system of FIG. 1 may operate.

FIG. 2 is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications to use or manage a distributed storage system, such as distributed storage system 1 in FIG. 1.

Figure 3:
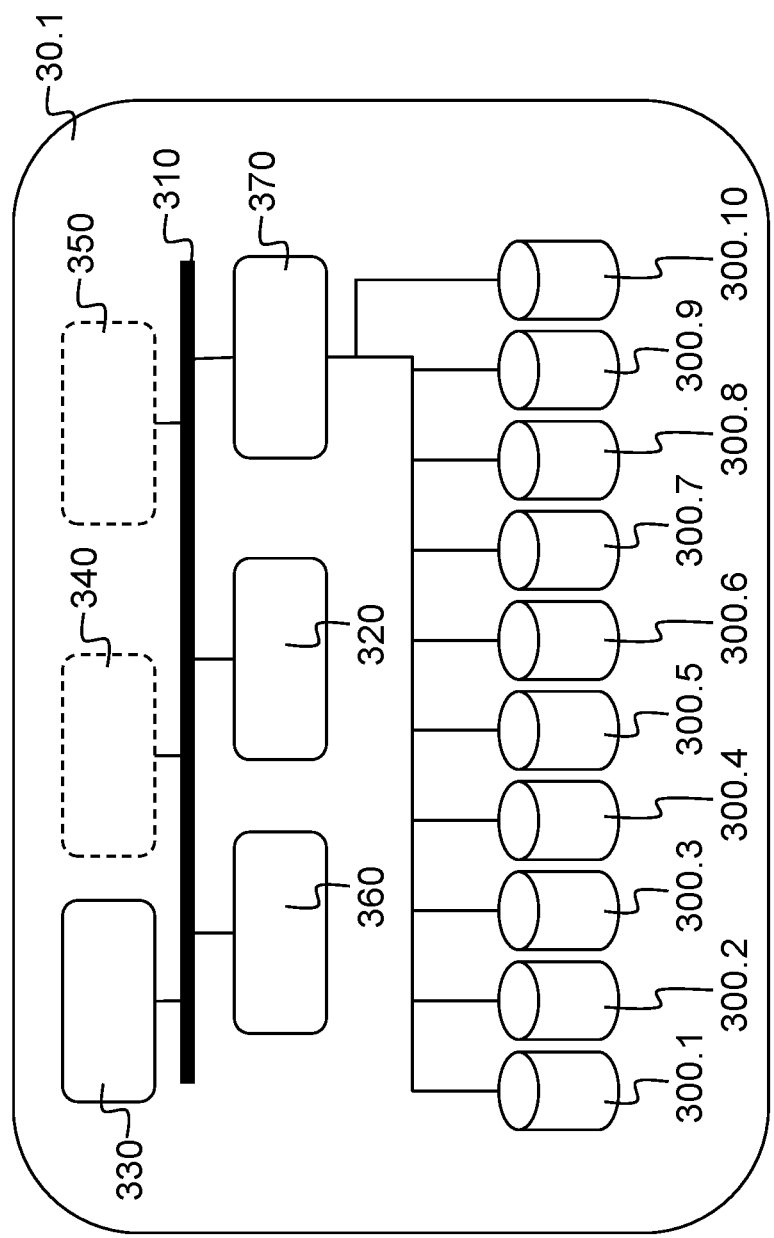
FIG. 3 schematically illustrates an example of a storage node of the distributed storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or access nodes 20 such as for example two 1 Gb Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 2, such a storage node 30.1 could comprise ten or twelve 3 TB SATA disk drives as storage elements 300.1-300.10 and in this way storage node 30.1 would provide a storage capacity of 30 TB or 36 TB to the distributed storage system 1. According to the exemplary embodiment of FIG. 1 and in the event that storage nodes 30.2-30.40 are identical to storage node 30.1 and each comprise a storage capacity of 36 TB, the distributed storage system 1 would then have a total storage capacity of 1440 TB.

As is clear from FIGS. 1 and 3 the distributed storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the distributed storage system. Each of the storage nodes 30 may comprise a share of these storage elements 300.

As shown in FIG. 1 storage node 30.1 comprises ten storage elements 300.1-300.10. Other storage nodes 30 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. As will be explained in further detail below, the distributed storage system 1 may be operable as a distributed object storage system to store and retrieve a data object comprising data (e.g. 64 megabytes (MB) of binary data) and a data object identifier for addressing this data object, for example, a universally unique identifier such as a globally unique identifier (GUID). Embodiments of the distributed storage system 1 may operate as a distributed object storage system. Storing the data offered for storage by the application in the form of a data object, also referred to as object storage, may have specific advantages over other storage schemes such as block-based storage or file-based storage.

The storage elements 300 or a portion thereof may be redundant and operate independently of one another. This means that if one particular storage element 300 fails its function it can easily be taken on by another storage element 300 in the distributed storage system 1. However, as will be explained in more detail further below, the storage elements 300 are capable of providing redundancy without having to work in synchronism, as is for example the case in many well-known redundant array of independent disks (RAID) configurations, which sometimes even require disc spindle rotation to be synchronised. Furthermore, the independent and redundant operation of the storage elements 300 may allow a suitable mix of types of storage elements 300 to be used in a particular distributed storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of the distributed storage system 1 as it allows for adding or removing storage elements 300 without imposing specific requirements to their design in correlation to other storage elements 300 already in use in the distributed object storage system.

Figure 4:
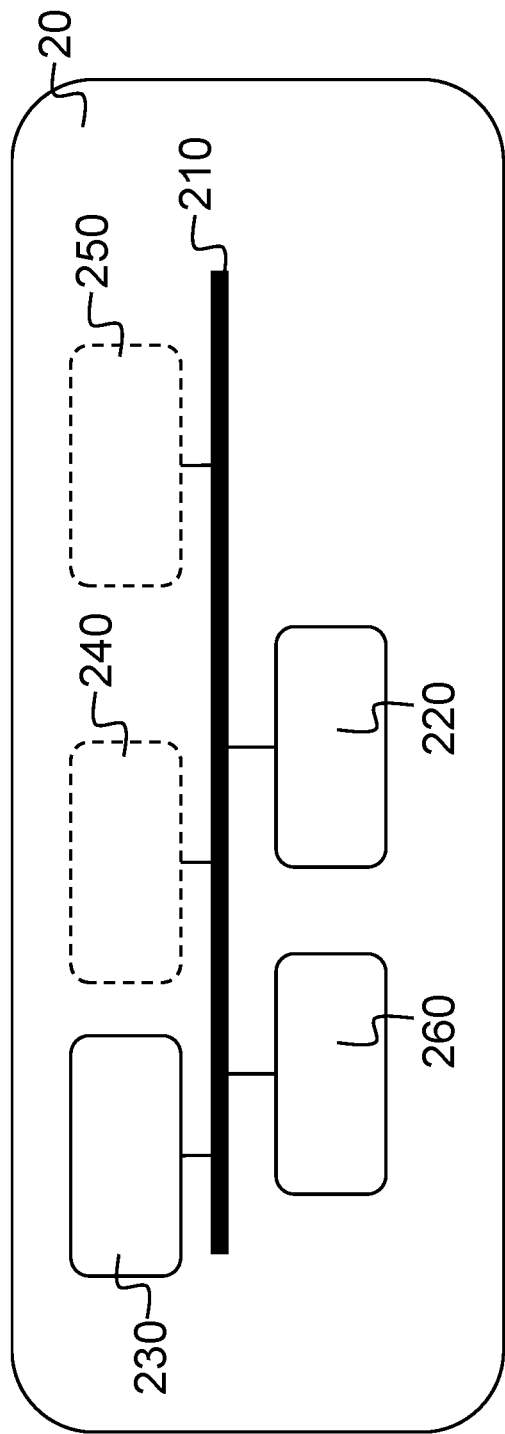
FIG. 4 schematically illustrates an example of a controller node or access node of the distributed storage system of FIG. 1.

FIG. 4 shows a schematic representation of an embodiment of the access node 20. Access node 20 may include controller node functions and/or file system interface functions for client systems using file system protocols to access data stored in data objects in storage nodes 30. Access node 20 may comprise a bus 210, a processor 220, a local memory 230, one or more optional input units 240, one or more optional output units 250.

Bus 210 may include one or more conductors that permit communication among the components of access node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the access node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables access node 20 to communicate with other devices and/or systems, for example mechanisms for communicating with other storage nodes 30 or access nodes 20 such as for example two 10 Gb Ethernet interfaces.

According to an alternative embodiment, the access node 20 could have an identical design as a storage node 30, or according to still a further alternative embodiment one of the storage nodes 30 of the distributed object storage system could perform both the function of an access node 20 and a storage node 30. According to still further embodiments, the components of the access node 20 as described in more detail below could be distributed amongst a plurality of access nodes 20 and/or storage nodes 30 in any suitable way. According to still a further embodiment, the clients 10 may run an access node 20. According to still further embodiments, access node 20 may be embodied in separate controller nodes and interface nodes with or without redundancy among the controller nodes and/or interface nodes.

Figure 5:
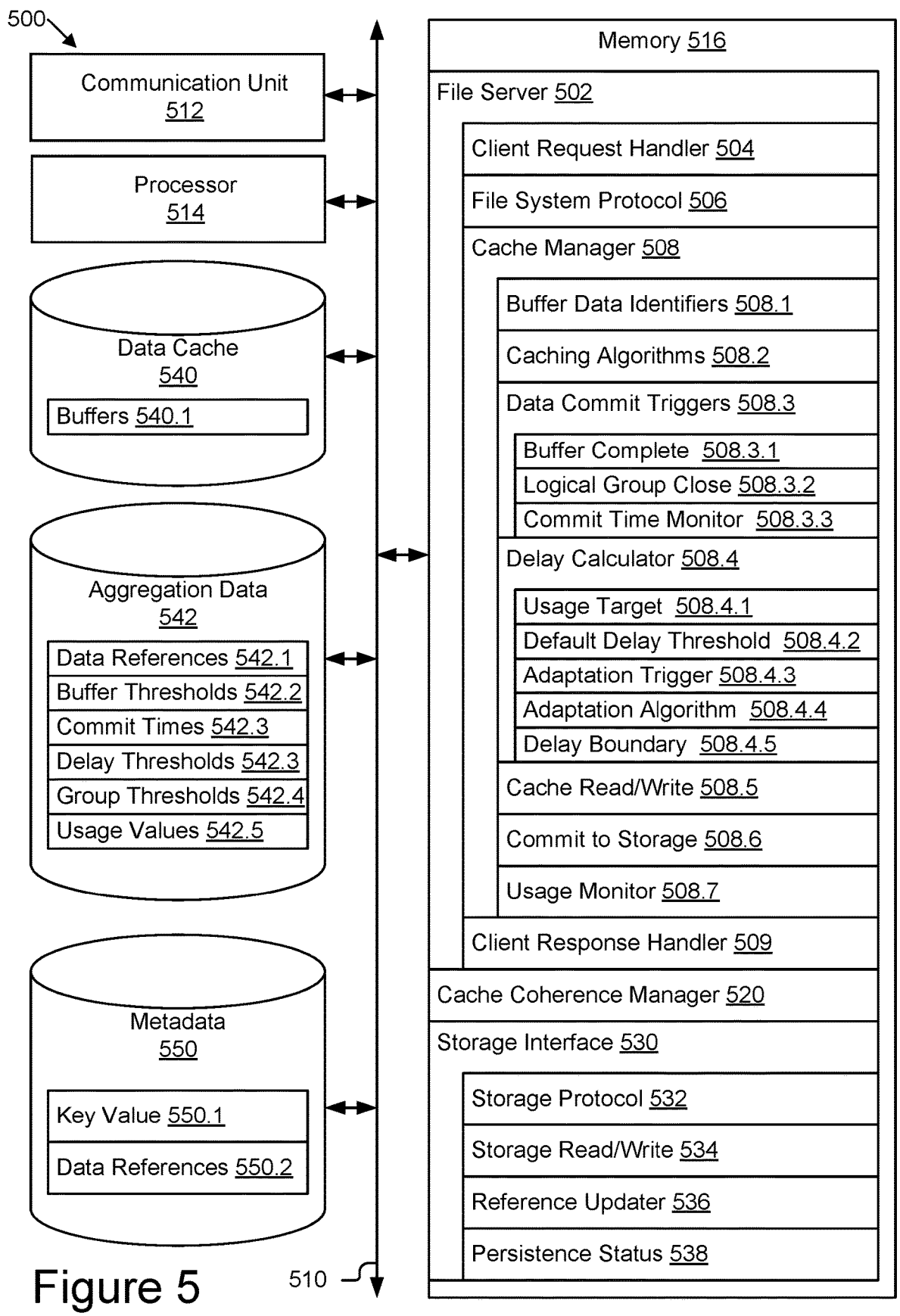
FIG. 5 schematically illustrates some example elements of a file interface system for the distributed storage system of FIG. 1.

FIG. 5 schematically shows selected modules of an access node or controller node with file system interface functions. Access system 500 may be configured as a node with an architecture and/or hardware similar to controller nodes and/or storage nodes. Access system 500 may incorporate elements and configurations similar to those shown in FIGS. 1-4. For example, access system 500 may be configured in an access node 20 with file system interface support.

Access system 500 may include a bus 510 interconnecting at least one communication unit 512, at least one processor 514, and at least one memory 516. Bus 510 may include one or more conductors that permit communication among the components of access system 500. Communication unit 512 may include any transceiver-like mechanism that enables access system 500 to communicate with other devices and/or systems. For example, communication unit 512 may include wired or wireless mechanisms for communicating with file system clients, other access systems, and/or one or more object storage systems or components, such as storage nodes or controller nodes. Processor 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disc or a solid state storage element.

Access system 500 may include or have access to one or more databases and/or specialized data stores, such as data cache 540, aggregation data store 542, and metadata store 550. Databases may include one or more data structures for storing, retrieving, indexing, searching, filtering, etc. of structured and/or unstructured data elements.

In some embodiments, data cache 540 may include a plurality of specialized buffer memories for efficiently aggregating file data requests into data elements for transfer to a backend storage system, such as the storage nodes 30 of distributed storage system 1, as well as for accelerating read/write requests by processing results from data cache 540 without having to access the backend storage system. Aggregation data store 542 may include one or more data structures for operational data related to use of data cache 540 for processing file read/write requests and committing and retrieving data from persistent storage. Metadata store 550 may be structured as reference data entries and/or data fields indexed by metadata key value entries.

In some embodiments, metadata store 550, aggregation data store 542, data cache 540, and/or other databases may be maintained and managed in separate computing systems with separate communication, processor, memory, and other computing resources and accessed by access system 500 through database access protocols, such as structured query language (SQL). One or more databases may be structured as key-value stores and may be shared across multiple access systems 500.

Access system 500 may include a plurality of modules or subsystems that are stored and/or instantiated in memory 516 for execution by processor 514. For example, memory 516 may include a file server 502 configured to receive, process, and respond to file data requests from file system clients using file system protocols. Memory 516 may include a cache coherence manager 520 for maintaining coherence across read/write caches (e.g. data cache 540) in a plurality of file access systems. Memory 516 may include a storage interface 530 for processing data storage requests to a persistent storage system, such as the storage nodes 30 of distributed storage system 1. File server 502 may be configured to receive file data requests, process the received file data requests using data cache 540 to generate one or more storage data requests through storage interface 530 for processing by an associated distributed storage system. For example, a plurality of file data requests using an NFS protocol may be aggregated in data cache 540 until storage interface 530 generates an object data request for an object storage system based on the aggregated file data. File server 502 may communicate with metadata store 550 to store and retrieve data element cross-reference metadata to map the file system files of the requesting client to the storage data elements and/or locations of the distributed storage system. In some embodiments, cache coherence manager 520 and/or storage interface 530 may be integrated into file server 502 and/or managed as separate libraries or background processes (e.g. daemon) through an API or other interface.

File server 502 may receive a plurality file data requests from one or more file system clients. These file data requests may be include file data elements of a defined size, such as 4K, 512K, 1 MB, or other file block sizes. The distributed storage system may be configured to preferably handle a different, larger block size and storage interface 530 may be configured for storage requests in that larger block size. For example, it may be more efficient for storage interface 530 to handle 2 MB, 8 MB, 16 MB, etc. storage elements where possible. Data cache 540 may include a plurality of buffers or buffer segments configured to match the preferred storage element size, such as 8 MB, which are then allocated in locations corresponding to file element sizes, such as 1 MB. File server 502 may include a variety of configurations for allocating cache storage, aggregating file data requests, determining when a storage operation to persistent storage (commit) is triggered, and acknowledging file data operations back to the client systems.

File server 502 may include a client request handler 504, a file system protocol 506, a cache manager 508, and a client response handler 509. File server 502 may include additional modules (not shown) for other data access features, such as duplicate request handling, request prioritization, metadata management, etc.

Client request handler 504 may include an interface and/or communication event-based condition for receiving file data requests from one or more file system clients. For example, client systems may send a file data request over a network connection and addressed to access system 500 or a port or component thereof. Client request handler 504 may receive these requests and parse them according to the appropriate communication and file system protocol (such as defined in file system protocol 506). For example, client request handler 504 may identify a transaction identifier, a client identifier, a file identifier, a data operation, and additional parameters for the data operation, if any, from the received message or messages that make up the file data request. In some embodiments, a file size may be included in the file data request.

File system protocol 506 may include configuration settings, functions, modules, application protocol interfaces (APIs), extensions, or other elements to support a selected file system protocol. For example, file server 502 may be configured to support a specific set of client systems that use a selected file system protocol, such as such as a NFS, SMB, FAT, HDFS, GFS, etc. protocol. File server 502 may support a single file system protocol or select a protocol from a set of available protocols. In some embodiments, the other modules of file server 502 may utilize the configuration settings or other functions of file system protocol 506 to support receiving, parsing, processing, and responding to file data requests in the selected file system protocol.

Cache manager 508 may include an interface protocol or set of functions and parameters for storing, reading, and otherwise managing data stored in one or more cache locations, such as data cache 540. For example, cache manager 508 may include functions for writing to and reading from data cache 540 in support of processing file data requests received by file server 502. Cache manager 508 may include a data structure and interface for mapping file data into storage locations in data cache 540. Cache manager 508 may include a data structure and interface for storing and/or retrieving cache data references, such as buffer location identifiers, to and/or from metadata store 550. Cache manager 508 may include a data structure and interface for storing and retrieving operational data, such as buffer usage information, configurations, and parameters, to and/or from aggregation data store 542. Cache manager 508 may use cache coherence manager 520 for validating the coherence of a selected cache storage locations and/or identifying an alternative cache location containing the current data. Cache manager 508 may include logic for identifying when cached data should be committed to backend storage by determining a data commit trigger for storage interface 530.

In some embodiments, cache manager 508 may include buffer data identifiers 508.1, caching algorithms 508.2, data commit triggers 508.3, delay calculator 508.4, cache read/write 508.5, commit to storage 508.6, and usage monitor 508.7.

Cache manager 508 may include and/or access a variety of logical and/or physical location references, collectively buffer data identifiers 508.1, for file data as it is received from file system clients and stored and/or read to and from cache. In some embodiments, cache manager 508 may include and/or access reference information for the backend storage system as well. Buffer data identifiers 508.1 may be stored in aggregation data store 542 as data references 542.1 and/or in metadata store 550 as data references 550.2. In some embodiments, aggregation data store 542 is a local memory resource and metadata store 550 is a remote or distributed memory resource. In some embodiments, buffer data identifiers may include buffer identifiers, location identifiers, and data element identifiers.

Buffer identifiers may include unique identifiers that correspond to a physical buffer memory or segment of buffer memory. For example, cache manager 508 may assign a unique buffer identifier or similar buffer reference to each buffer location 540.1 corresponding to a predetermined storage size, such as each 8 MB segment of data cache 540. Location identifiers may assign position references to storage locations within each buffer, such as with a granularity corresponding to a file block size. For example, each buffer or buffer segment with a buffer identifier may be subdivided into a sequence of incremental location identifiers, such as 1 MB increments with serialized positions 0, 1, 2, 3, 4, 5, 6, 7. Thus, the combination of buffer identifier and location identifier may indicate a specific cache block within data cache 540.

A buffer, as identified by a buffer identifier, may be regarded as full when data elements, such as file data blocks, have been written to all of the positions or locations within the buffer. A buffer that still has one or more open locations that do not include a data element may be regarded as partial or unfilled. In some embodiments, cache manager may use a buffer threshold 542.2 stored in aggregation data 542 to configure and determine when a buffer is assigned a full status or state. For example, buffer threshold 542.2 may include configurable settings that require all locations to be fully utilized or may set a lower threshold, particularly in systems that handle multiple file data element sizes. For example, if a file system preferentially provides 1 MB data elements for aggregation, but can provide $512k$ or 4K data elements, buffer threshold 542.2 for an 8 MB buffer may be set to greater than 7 MB, since a buffer with more than 7 MB in it will no longer be able to receive the preferred 1 MB data element. In some embodiments, the buffer threshold may be dynamically determined in accordance with one or more caching algorithms 508.2.

Data element identifiers may include a buffer location in data cache 540 that contains (or is ready to be written with) file data related to a file data request. In some embodiments, data element identifiers may be expressed as a buffer identifier, plus a starting location identifier, plus a file length, which may be expressed as a number of storage locations (based on the assigned location granularity, such as defined bytes or blocks). Alternatively, data element identifiers may express the extent of the file data in terms of a location range, including the start location and end location for the file or other data segment. Data element identifier may then be mapped to the file data reference corresponding to the file data in the cache location.

Caching algorithms 508.2 may include an interface protocol or set of functions and parameters for managing caching decisions, such as whether to execute a particular file data request from cache or from persistent storage in the backend storage system. For example, caching algorithms 508.2 may include logic for determining whether file data relevant to a read request is currently available in data cache 540 and/or whether to write new file data to cache or directly to persistent storage. In some embodiments, caching algorithms 508.2 may include logic for allocating write requests to buffer locations (e.g. cache storage locations addressed by buffer identifiers and location identifiers) in order to aggregate smaller file data segments into larger aggregate storage elements, such as larger data objects. A variety of caching algorithms are available depending on the use and configuration of access system 500 and related client and distributed storage systems and expected file sizes and usage patterns. In some embodiments, caching algorithms 508.2 may be a set of configurable parameters for determining various thresholds and/or other decision-making logic for efficiently allocating write and/or read requests to data cache 540.

In some embodiments, caching algorithms 508.2 may include cache versus persistent storage allocation, buffer and/or location selection and sequencing within data cache 540, parameters for remote cache access, triggers for committing cached file data to persistent storage, triggers for clearing cache, etc. In some embodiments, caching algorithms 508.2 are executed from a cache management library accessible to file server 502. One or more caching algorithms 508.2 may invoke data commit triggers 508.3 and/or delay calculator 508.4 for determining when a data commit trigger should be passed to storage interface 530 to move the contents of one or more buffer locations to persistent storage.

Data commit triggers 508.3 may be functions, conditions, states, or status messages that trigger a cache or portion of cache, such as a buffer, to be committed to persistent storage. For example, data commit triggers 508.3 may generate a message, system call, or similar cue to storage interface 530 to execute a write operation to the persistent storage system associated with the data elements in the cache. In some embodiments, data commit triggers 508.3 may include parameters for the write operation to persistent storage, such as buffer data identifiers. The parameters may further allow storage interface 530 to search metadata store 550 for additional metadata describing source file system, data object metadata, and other information to be passed to the persistent storage system in order to execute a storage operation for an aggregate data element, such as a data object containing a plurality of file data elements.

In some embodiments, data commit triggers 508.3 may include buffer complete condition 508.3.1, logical group close condition 508.3.2, and commit time monitor 508.3.3. Buffer complete condition 508.3.1 may indicate that a buffer is full to capacity and should immediately be committed to persistent storage. In some embodiments, buffer complete condition 508.3.1 may use buffer threshold 542.2 to determine when a buffer is full.

Logical group close condition 508.3.2 may indicate that a logical data group, such as an inode, bucket, volume, file system, erasure coded group, data session, or similar grouping of related data elements, is being closed to additional writes for some period and all cached write data should be committed to persistent storage. In some embodiments, cache manager 508 may locate logically related data elements in the same buffers, so buffers may be committed and cleared when logical group close condition 508.3.2 indicates that no additional logically related data elements are likely to be received in the near future.

Commit time monitor 508.3.3 may indicate that delay time has elapsed for a particular buffer and it should be committed (even though not complete under buffer complete condition 508.3.1). For example, a delay time may be calculated after the buffer is initially written to or allocated for use, such as from the time of the first data element written to the buffer or the from the time the most recent data element was written to the buffer. In some embodiments, multiple commit time monitors may be used for the same buffer to track multiple delay values. Commit time monitor 508.3.3 may include a commit time value that increments with time from a delay start value, such as the buffer allocation time, first element write time, or most recent element write time. Commit time monitor 508.3.3 may compare these commit time values to one or more delay thresholds assigned to the buffer. If the commit time value satisfies the corresponding delay threshold for the buffer, commit time monitor 508.3.3 determines a data commit trigger. For example, if an incrementally increasing commit time value equals or exceeds the delay threshold, a data commit trigger may be generated.

In some embodiments, commit time values 542.3 and delay thresholds 542.3 may be stored in a data structure in aggregation data store 542. For example, commit time values 542.3 and delay thresholds 542.3 may be stored in a table indexed by buffer identifier to enable cache manager 508 to use commit time monitor 508.3.3 to track commit times and delay thresholds for all active buffers, alongside other buffer management information and caching algorithm values. In some embodiments, delay thresholds 542.3 may be assigned to specific logical data groups related to either the source file system and/or destination persistent storage system and cache manager 508 may dynamically assign the delay threshold once the buffer is being used for a selected logical data group. For example, a plurality of logical data group delay thresholds 542.4 may be calculated by delay calculator 508.4 and stored in aggregation data store 542.

Delay calculator 508.4 may include an interface protocol or set of functions and parameters for calculating threshold delays for assignment to buffers, such as by commit time monitor 508.3.3. Delay calculator 508.4 may include logic and data structures for assigning an initial delay value and the adapting that delay value over time using buffer usage values to improve system performance. Example usage values may include the number of buffers used, frequency of buffer use, time the buffers are used, characteristics of the data elements aggregated in the buffer, characteristics of the aggregate data elements written to persistent storage, and other usage values. Usage values may be tracked, such as using usage monitor 508.7, at system level, source and destination system levels, for various logical data groups, and down to specific data types, elements, and other characteristics that could be relevant to buffer allocation. In some embodiments, usage values 542.5 may be stored in aggregation data store 542 and accessed and used by delay calculator 508.4. In some embodiments, delay calculator 508.4 may manage a plurality of delay threshold values at system or logical data group levels and each may adapt independently. Delay calculator 508.4 may be initiated for a target system or segment on a schedule, such as every X minutes, seconds, or milliseconds, or upon event, such as the close of a logical data group. In some embodiments, delay calculator 508.4 may include usage target 508.4.1, default delay threshold 508.4.2, adaptation trigger 508.4.3, adaptation algorithm 508.4.4, and delay threshold boundary 508.4.5.

Usage target 508.4.1 may include one or more usage target values that describe a desired set of usage parameters. For example, if the selected usage parameter is utilization of complete buffers at the time of commitment to long-term storage, the usage target value may be expressed as a percentage of complete buffer writes compared to total buffer writes. Usage values 542.5 may record the data commit trigger for each commit to persistent storage and aggregate those statistics as usage values corresponding to buffer complete condition 508.3.1, logical group close condition 508.3.2, and commit time monitor 508.3.3 (delay threshold satisfied condition). The buffer complete condition usage value may be divided by the total number of buffer commits (e.g. the sum of the three trigger conditions or a separately tracked usage value) to determine the percentage of writes to the persistent storage medium with aggregate data elements that exceed the usage target for the data cache (or segment of interest, like logical data group).

For example, for a given system (or segment), the system administrators may select a usage target of 80%, so no more than 20 writes in 100 should generate an aggregate data element that does not meet the buffer threshold, which may be matched to the preferred data element size of the persistent storage system. By setting the usage target at 80%, the system administrator may expect that the delay threshold should be adapted until the 80% target is achieved or exceeded (or a delay boundary 508.4.5 is met).

Default delay threshold 508.4.2 may provide a default starting value for setting delay thresholds in the absence of usage data or prior iterations for the system or segment delay threshold being set. For example, a system administrator may configure the system to use a default delay threshold 508.4.2 of 25 milliseconds with an expectation that the delay threshold may adapt from that point. In some embodiments, the adaptation algorithm may provide for adapting in only one direction, such as increasing value, and default delay threshold 508.4.2 may be selected at the opposite end of the desired range for threshold values. So, in the increasing adaptation algorithm example, default delay threshold 508.4.2 may provide the minimum delay threshold for the delay calculator (which may correspond with a delay boundary 508.4.5).

Adaptation trigger 508.4.3 may include the trigger conditions for adapting the delay threshold based on the usage target. For example, adaptation trigger 508.4.3 may specify the comparison of usage values 542.5 to usage target 508.4.1 that initiate an iteration of adaptation algorithm 508.4.4. As provided above in the usage target example, adaptation trigger 508.4.2 determines and compares the actual buffer usage to the desired usage target of 80%. If the buffer usage does not meet the usage target, then the adaptation algorithm is invoked. If the buffer usage does meet the usage target, the delay threshold is maintained at its current value and no adaption occurs until the next delay calculation.

Adaptation algorithm 508.4.4 may use the current (or prior) delay threshold value, with which the most recent set of usage data was generated, to generate a new delay threshold. For example, adaptation algorithm 508.4.4 applies a transfer function to the current delay threshold to generate the new delay threshold value. In some embodiments, adaptation algorithm 508.4.4 may be represented by a curve in which the only variable is the current delay threshold. In other embodiments, additional variables, such as variables related to the difference between the current usage value and the usage target and/or characteristics of the buffers or segments may be used to define the transfer function. In some embodiments, adaptation algorithm 508.4.4 may implement one or more delay boundaries 508.4.5, such as a minimum delay value and a maximum delay value. An example adaptation algorithm may be:

$$\text{new delay} = \text{current delay} + \min(100 \times \frac{1}{2}^{\text{current delay}/250}, 1500)$$

Where new delay may be the newly calculated delay threshold, current delay may be the prior delay threshold before this iteration, $100 \times \frac{1}{2}^{\text{current delay}/250}$ may be the adaptation factor (also based on current delay), and 1500 may be the maximum delay value from delay boundaries 508.4.5. In some embodiments, new delay and current delay may be measured in milliseconds. In the foregoing transfer function, the prior delay threshold is incremented in a positive direction along a curve defined by the adaptation factor. It may start from default delay threshold 508.4.2, which establishes the minimum delay threshold, and, due to the min function, cannot exceed the maximum delay value.

Cache read/write 508.5 may include interface protocols and/or a set of functions and parameters for managing read/write access to data cache 540 and/or similar data caches maintained on other systems, such as a plurality of access systems similar to access system 500. For example, in response to cache manager 508 determining that data cache 540 is going to be used for processing a new file data request, cache read/write 508.5 may be called to access and store file data to the identified buffer storage locations. In some embodiments, when cache read/write 508.5 is invoked for a storage operation from cache, cache coherence manager 520 may be triggered to verify the coherence of the file data in the identified cache and/or return an alternative cache location containing more current file data. In some embodiments, cache read/write 508.6 may also enable access to cache memory through communication unit 512 rather than across bus 510. For example, a remote direct memory access (RDMA) protocol may enable access to the buffer memory of another access system.

Commit to storage 508.6 may include interface protocols and/or a set of functions and parameters for managing read/write access to the persistent storage system, such as storage nodes 30 of distributed storage system 1. Commit to storage 508.6 may be a portion of the capabilities for accessing the persistent storage system, through storage interface 530. For example, file data also may be retrieved from the persistent storage system and placed into cache for processing a read request that is needed for repeated reads or read/modify/write operations. As data commit triggers 508.3 are satisfied, commit to storage 508.6 may be responsible for determining, configuring, and/or transferring the data write message for the aggregate data element to storage interface 530. For example, commit to storage 508.6 may invoke storage interface 530 for writing to the persistent storage system using an aggregate data object (or the aggregate file data elements thereof) moved from data cache 540 to the persistent storage system.

Usage monitor 508.7 may include interface protocols and/or a set of functions and parameters for managing the identification, determination, storage, and maintenance of one or more usage values 542.5. Usage monitor 508.7 may collect usage information from the operation of cache manager 508, file server 502, and/or other system components. In some embodiments, usage monitor 508.7 may utilize a variety of functions built into other operations for logging or managing their processes. Usage monitor 508.7 may aggregate or provide an interface for values of interest in usage calculation. For example, usage monitor 508.7 may monitor for data commit triggers and/or commit to storage messages and/or access operational logs of file server 502 and/or storage interface 530 in order to store relevant usage values 542.5 in aggregation data store 542.

Client response handler 509 may include an interface and/or communication logic for sending response messages, such as result, status, or error messages, to one or more file system clients related to file data requests received. For example, client response handler 509 may wait for processing to complete or generate an error and provide an appropriate result or error message to the client system(s) for each file data request received. For some file data requests, client response handler 509 may send an acknowledgement message when file data has been stored.

In some configurations, this acknowledgement message may be expected by the client file systems to correlate to persistent storage. Because data cache 540 may not be persistent storage and may be subject to data loss in the event of a power failure or other error, client response handler 509 may not immediately return an acknowledgement message in response to file data requests processed to data cache 540. Client response handler 509 may aggregate acknowledgement messages and send them in response to writing the relevant file data to persistent storage. For example, as cache manager 508 aggregates file data writes in data cache 540, no acknowledgement messages may be sent to the client file systems. When storage interface 530 writes the contents of the cache corresponding to those file data writes to persistent storage, a trigger may be sent to client response handler 509 to send the aggregated acknowledgements to the client file systems.

Cache coherence manager 520 may be invoked by file server 502 to verify that the file data being used to process a new file data request from data cache 540 represents the current version of the file data. For example, it may be possible that another access node has processed a request changing the target file data and has the updated data in cache. Cache coherence manager 520 may provide interfaces, functions, and parameters for verifying the coherence of the local cache and/or redirecting the file data request to another data cache with updated file data. In some embodiments, cache coherence manager 520 may be included within file server, such as within a library function used by cache manager 508.

Storage interface 530 may be a persistent storage interface and include an interface protocol or set of functions and parameters for storing, reading, and otherwise managing data requests to an associated distributed storage system and the corresponding metadata data source for mapping file data to persistent storage data elements. For example, storage interface 530 may include functions for reading, writing, modifying, or otherwise manipulating data objects and their respective client data and metadata in accordance with the protocols of an object storage system. Storage interface 530 may generate data requests translated and mapped from data references 550.2 using metadata store 550. Storage interface 530 may include a storage protocol 532, storage read/write 534, reference updater 536, and persistence status 538.

Storage protocol 532 may define a storage protocol used for sending storage data requests to one or more backend storage systems, such as distributed storage system 1. For example, storage protocol 532 may include an object storage protocol, a different file system protocol than file system protocol 506, or another storage paradigm for persistent storage. Storage read/write 534 may include interfaces, functions, and/or parameters for reading and writing data elements from/to the backend storage system in accordance with storage protocol 531. For example, a storage write may be configured to write aggregate data storage elements to persistent storage in response to buffers in data cache 540 becoming full or other triggers for persistent storage (e.g. in response to commit to storage 508.6). Storage read/write 534 may read data from persistent storage and place it into data cache 540 through or in cooperation with cache manager 508. In some embodiments, storage write and storage read may also support processing file data requests through file server 502 without accessing data cache 540 as an intermediary.

Reference updater 536 may be configured to update one or more references in metadata store 550 in response to the processing of file data requests through file server 502. For example, reference updater 536 may initiate and/or update data references 550.2. Storage writes may update one or more file data and storage data references in data references 550.2. File write requests received by file server 502 may update one or more data references 550.2. The actions of cache manager 508 and cache coherence manager 520 may update one or more data references 550.2. Reference updater 536 may operate in conjunction with file server 502, cache coherence manager 520, and/or the persistent storage system to generate and update various references in metadata store 550 or other reference storage.

Persistence status 538 may return status messages with regard to file data being stored in persistent storage in the backend storage system. For example, when a storage element, such as a data object containing file data, is successfully written into the backend storage system, a confirmation or success message may be returned to storage interface 530 for that storage element. In response, persistence status 538 may send one or more status messages to file server 502 for each data file in the storage element. In some embodiments, persistence status 538 may use the data reference 550.2 mapping information to determine what file data was included in the written storage element and include the list of file data references in a persistence status message to file server 502. In some embodiments, client response handler 509 may delay acknowledgement of file data requests writing data into data cache 540 until the corresponding persistence status message is received from persistence status 538.

In some embodiments, metadata store 550 may be distributed across multiple systems, such as a plurality of access systems. Metadata store 550 and/or portions thereof may be sharded data stores, wherein the data stores are partitioned into segments stored in different computing systems. Storage interface 530 may include the functions for locating and accessing relevant portions of the sharded database, such as to support cache manager 508, cache coherence manager 520, and/or other functions of file server 502.

In some embodiments, metadata store 550 is structured as a key-value store. Each key value 550.1 may index a number of corresponding fields, such a plurality of data reference 550.4, such as file data references, cache data references, storage data references, coherence reference, etc., some uses of which have been explained above.

File data references may provide a file data identifier, such as inode and file name, and/or parameters for generating a file data identifier corresponding to a client data file identified in a file data request in accordance with file system protocol 506. File data references may include additional file data related metadata used for managing file data requests. Cache data references may include file data identifiers, including buffer identifiers and location identifiers for each file data element. For example, a given key value 550.1, sometimes derived from a file data reference, may index a cache data reference and map it to the corresponding file data reference.

Storage data reference may provide a data object identifier, such as a global unique identifier (GUID), and/or parameters for generating a data object identifier corresponding to client data stored in data objects in an associated object storage system and corresponding to the client data file associated with the key entry. Other storage data references may include logical and/or physical mapping for the distributed storage system, such as logical block addresses, file identifiers for a different file-based storage system, etc.

Storage data references may be used when the file data in data cache 540 is going to be read from or committed to the backend storage system. Coherence references may provide a code for validating the current state of the file data in a cache with the current version of the file data, which may not be present in data cache 540, as described above.

File server 502 and/or memory 516 may include additional logic and other resources (not shown) for processing file data requests, such as modules for generating, queueing, and otherwise managing data requests. Processing of a file data request by file server 502 may include any number of intermediate steps that yield at least one data request to the distributed storage system from storage interface 530, such as an object data request to an object storage system.

Figure 6:
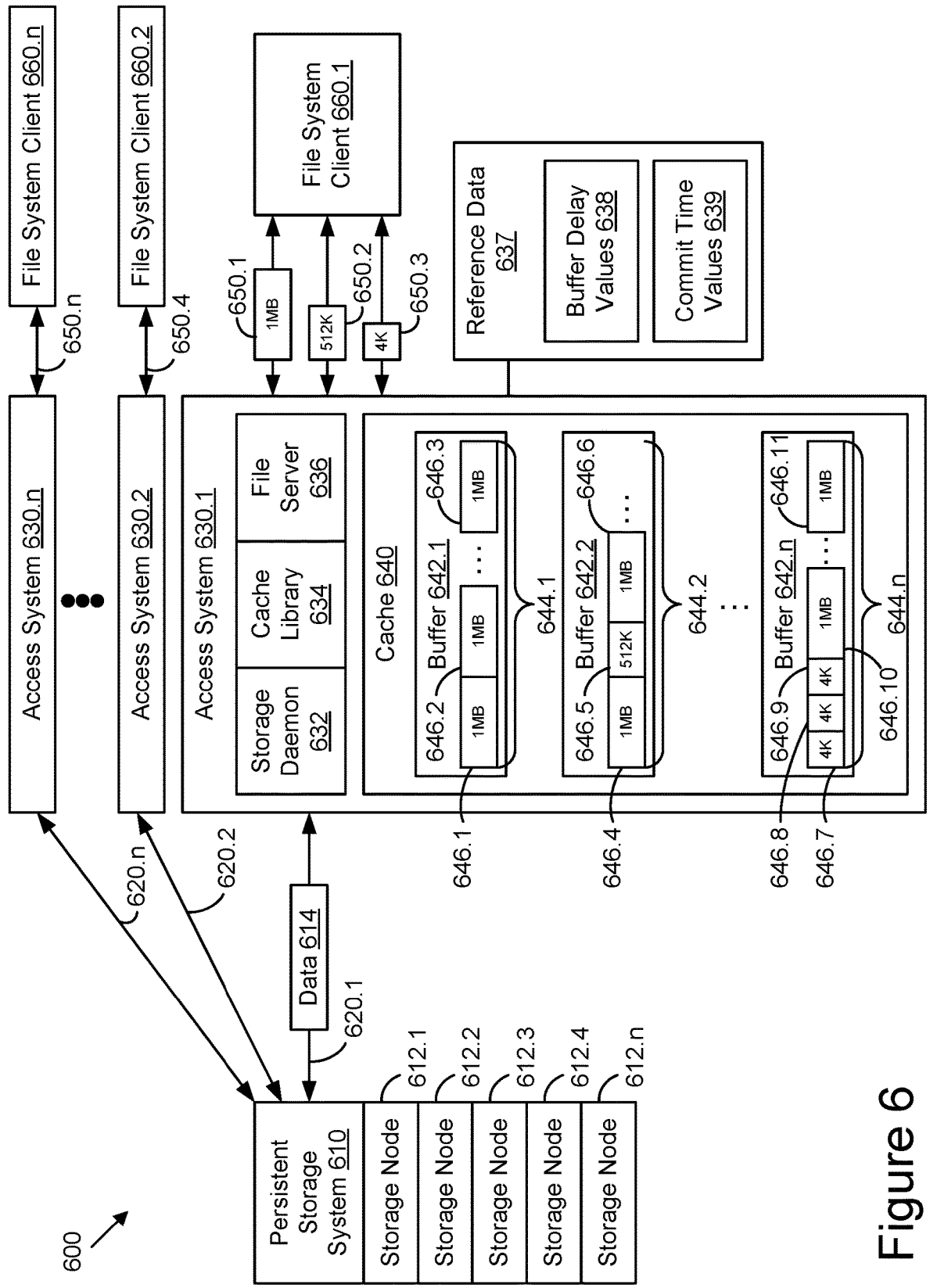
FIG. 6 schematically illustrates interactions among example file system clients, access systems, and persistent storage system, such as the distributed storage system of FIG. 1.

FIG. 6 shows a distributed storage system 600 with aggregation write cache for file data requests from a plurality of client systems through a plurality of access systems. In some embodiments, distributed storage system 600 may be configured according to the systems and elements described with regard to FIGS. 1-5. Distributed storage system 600 may include a persistent storage system 610 with a plurality of persistent storage nodes 612.1-612.n for receiving and processing storage data requests 620.1-620.n. Some storage data requests 620 may include aggregate storage elements, such as aggregate data element 614, containing file data related to multiple file data requests. A plurality of access systems 630.1-630.n may receive file data requests 650.1-650.n from file system clients 660.1-660.n. Reference data store 637 may include common file, storage, cache, and/or coherence references for use by access systems 630.

File system clients 660 may include computing systems using file system protocols to access and store file data. For example, individual computing systems, application servers, legacy enterprise network systems, and other systems may be configured with NFS protocols for data storage and retrieval. File system clients 660 may host or interface with one or more applications that generate file data requests 650, such as read, write, create, delete, move, etc. requests or commands for manipulating data files through data operations. File data requests 650 may include a transaction identifier, a client identifier, a file data identifier, a data operation, and additional parameters for the data operation, if any. File system clients 660 may expect to receive responses corresponding to requests 650, such as acknowledgement that write requests have been stored.

File system clients 660 may be configured to provide file data requests with file data elements corresponding to a file sizes and/or block sizes defined in their respective file system protocols. In some configurations, file system clients 660 may support a plurality of block sizes in file data requests 650, such as 4K file data element 650.3, 512K file data element 650.2, and 1 MB file data element 650.1. File system clients 660 may aggregate smaller file operations for file data requests 650. File system clients 660 may themselves be part of a storage network and different file system clients 660 may issue file data requests for the same file data stored in persistent storage system 610 and/or cached in access systems 630.

Selected modules and components in access system 630.1 are shown in FIG. 6. Other access systems 630.2-630.n may include similar configurations. Similarly, while only access system 630.1 is shown connected to reference data store 637, in other configurations each access system may have access to reference data store 637. In some embodiments, reference data store 637 may be distributed across access systems 630, with portions or shards of reference data store 637 stored in each access system 630 and/or accessible to or associated with each access system 630.

Access systems 630 may include storage daemon 632, cache library 634, file server 636 and cache memory 640. In some embodiments, storage daemon 632 may be a background process for managing functions related to accessing and updating reference data store 637 and moving file data from cache memory 640 to persistent storage system 610. For example, storage daemon 632 may perform a set of functions similar to storage interface 530, as well as cache coherence manager 520 as it relates to querying and updating reference data sources in metadata store 550, as described with regard to FIG. 5. Cache library 634 may include one or more functions for managing cache memory 640 and selectively processing file data requests from cache only when coherence is verified. For example, cache library 634 may perform a set of functions similar to cache manager 508 and those portions of cache coherence manager 520 not handled by storage daemon 632, as described with regard to FIG. 5. File server 636 may include a variety of functions related to receiving and processing file data requests 650 through cache memory 640 and to persistent storage system 610, when appropriate. For example, file server 636 may perform a set of functions similar to file server 502 in FIG. 5, including invoking the functions of cache library 634 and/or storage daemon 632 when appropriate.

Cache memory 640 may include a plurality of buffers 642.1-642.n, each having a corresponding buffer size 644.1-644.n. In some embodiments, buffer size 644 may be configured to match a preferred storage data element size for backend storage system 610, such as a preferred data object size for an object storage system. File server 636 may aggregate file data elements 646.1-646.n in the available buffers 642. Aggregate file data elements 646 may represent aggregate file data requests received by access system 630.1 and assigned to respective buffers 642. Each file data element 646 may correspond to one or more storage locations in buffers 642. For example, each file data element 646 may have a file data size corresponding to a number of data bytes or other units for allocating buffer storage and file data size and storage location within the buffer may be expressed as a byte range or byte positions from a starting position to an ending position. Cache library 634 may provide logic for allocating the file data in various file data requests across buffers 642 and storage daemon 632 may write buffers to persistent storage in persistent storage system 610 in response to various triggers, such as a buffer being full or more buffer space being needed for new file data requests.

Reference data 637 may include one or more data stores configured to support the operations of access systems 630. For example, reference data 637 may include databases and data structures similar to those described with regard to aggregation data store 542 and/or metadata store 550 with regard to FIG. 5. Reference data 637 may support cache commit decisions by access systems 630, such as by providing a repository for buffer delay values 638 and commit time values 639 that may be set and adapted for various buffers 642 using cache library 634.

While access systems 630 and file system clients 660 are shown in a one-to-one correlation with communication from, for example, file system client 660.1 to access system 630.1, alternate configurations may include different numbers and communication paths with regard to access systems and client systems. For example, a single access system may handle file data requests from a plurality of file system clients or a single file system client may send different file data requests to a plurality of access systems. In some configurations, a plurality of access systems 630 are configured with a plurality of file system clients 660 such that file data requests may be sent from and handled by any system for redundancy and/or requests may be dynamically load balanced across the available access systems and/or file system clients. Access systems 630 may be configured with metadata stores similar to metadata store 550 in FIG. 5 distributed and/or accessible through remote queries from storage daemons 632 of other access systems to assure cache coherence checking across access systems and regardless of source file system client.

Figure 7:
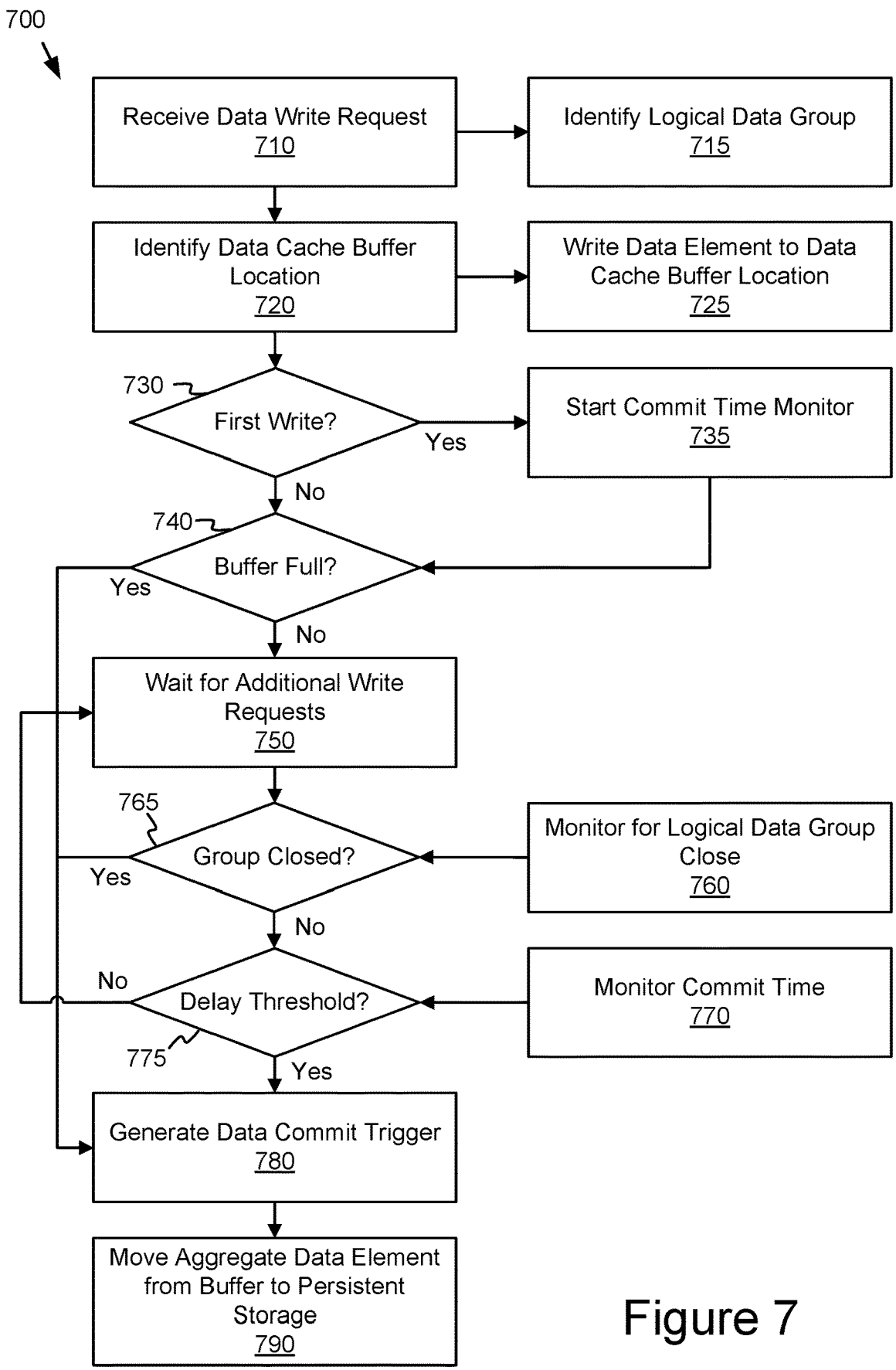
FIG. 7 illustrates an example of a method for managing cache commit timing using an aggregate write cache.

As shown in FIG. 7, the access systems 630 may be operated according to a method for managing cache commit timing using an aggregate write cache, i.e. according to the method 700 illustrated by the blocks 710-790 of FIG. 7.

When a client application is configured to manipulate file data stored on a distributed storage system, a file data request may be received at block 710 by an access system with a file system interface including a file server. For example, a new file data write request may be received that should be aggregated with other file data write requests to generate an aggregate data element for storage to a persistent storage system.

At block 715, a logical data group may be identified from the file data write request or associated system parameters. For example, the file data write request may include a file data element associated with an open inode.

At block 720, a data cache buffer location may be identified for caching the file data element in the write request and aggregating it with other file data requests. For example, a caching algorithm may use prior or expected data writes and available buffer spaces to select the buffer location to which the new file data element should be written.

At block 725, the data element may be written to the data cache buffer location. For example, a cache manager may store the new 1 MB data element in a buffer location within an 8 MB buffer.

At block 730, a start condition for triggering a commit time monitor, such as first write to an otherwise uncommitted buffer, may be evaluated. If the start condition is met, method 700 may proceed to block 725. If the start condition is not met, then the commit time monitor may already be running and method 700 may proceed to block 740.

At block 735, a commit time monitor for the cache buffer may be started. For example, each cache buffer may have an associated commit time monitor that tracks elapsed time for triggering a delay threshold for committing the contents of the buffer to persistent storage.

At block 740, a buffer full or buffer complete condition may be evaluated. For example, if the new data element fills the last available buffer location in the buffer or reaches a buffer threshold, the buffer may determine a buffer complete condition. If the buffer is complete, method 700 may proceed to block 780. If the buffer is not complete and could accommodate additional data elements, method 700 may proceed to block 750.

At block 750, the system may wait for additional write requests (and/or processes the next write request in a queue of data requests) allocated to the same buffer. For example, one or more future write requests may be associated with the same logical data group and a caching algorithm may determine that it should be written to the next available location in the same buffer as the data element received at block 710.

At block 760, the system may monitor for the logical data group associated with the first data write to close. For example, a connection to the file server for a particular inode may be closed because the host application does not have further requests to process to that inode. At block 765, notice of the close of the logical data group is evaluated. If the logical data group is closed, method 700 proceeds to block 780. If the logical data group is not closed, method 700 proceeds to block 775.

At block 770, the system may monitor for commit time, such as using the commit time monitor started in block 735. For example, the system may measure the elapsed time since the commit time monitor started to see whether a delay threshold has been met. At block 775, the commit time is compared to the delay threshold to determine whether the delay threshold is satisfied. If the delay threshold is satisfied, method 700 proceeds to block 780. If the delay threshold is not satisfied, method 700 proceeds back to block 750. Note that when an additional write request for the buffer is received, method 700 may continue back at block 720.

At block 780, a data commit trigger may be generated. For example, in response to any of the three trigger conditions in blocks 740, 765, or 775, a data commit trigger may be generated for requesting that the contents of the buffer be committed to persistent storage.

At block 790, the aggregate data element from the buffer may be moved to persistent storage. For example, responsive to the data commit trigger, the cache manager and/or storage interface may send the aggregate data element based on a plurality of data elements in the buffer locations of the buffer to the persistent storage system for storage on a persistent storage medium.

Figure 8:
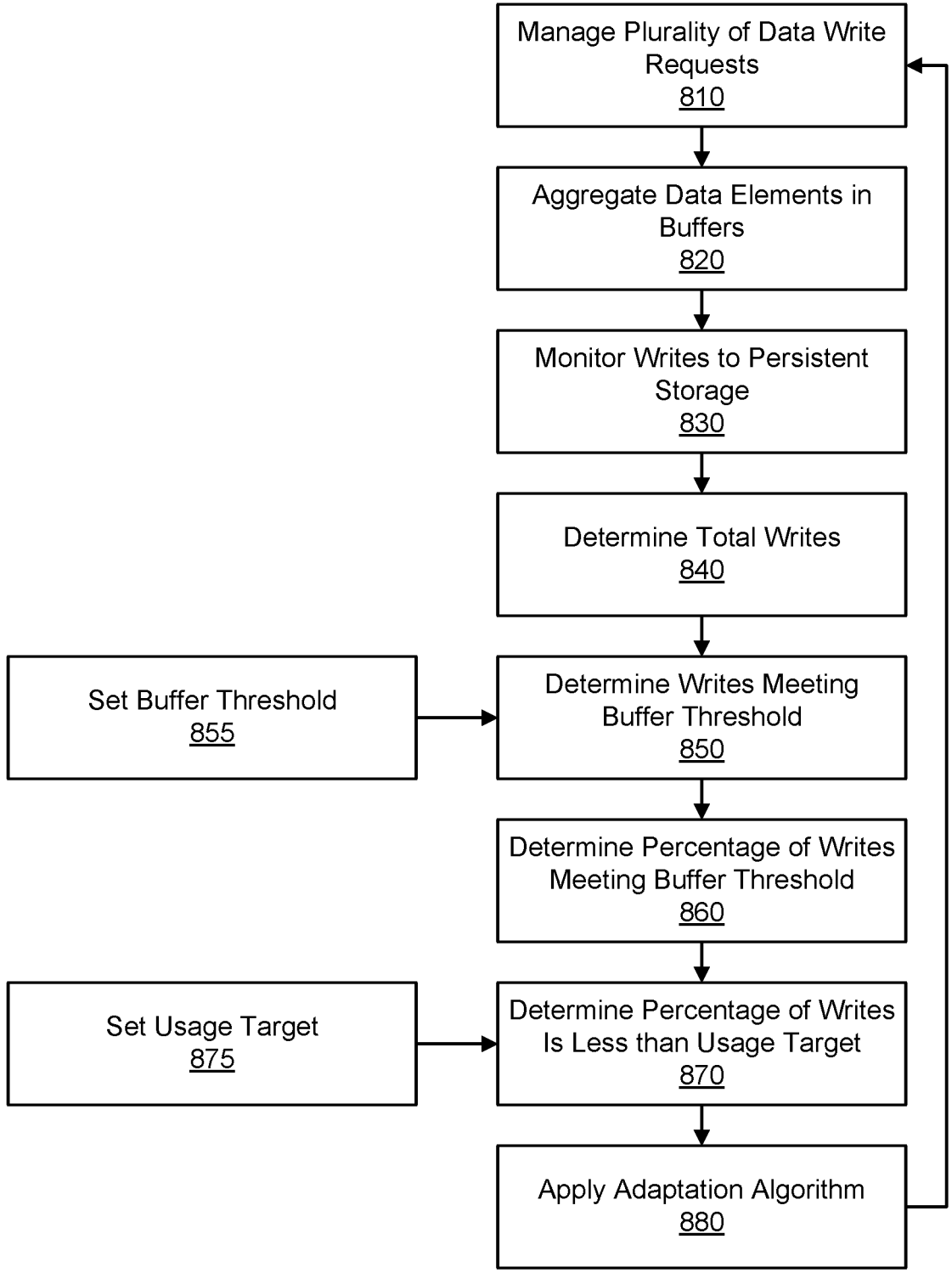
FIG. 8 illustrates an example method of adapting delay thresholds based on usage values, such as may be used with the method of FIG. 7.

As shown in FIG. 8, in some embodiments, the access systems 630 may be further operated according to a method of adapting delay thresholds based on usage values, i.e. according to the method 800 illustrated by the blocks 810-870 of FIG. 8.

At block 810, an access system may manage a plurality of data write requests for aggregation into larger data elements for persistent storage. For example, the access system may include a file server for receiving write requests from one or more file system with a data element size smaller than a preferred data element size of the persistent storage system.

At block 820, the plurality of data write requests may result in a plurality of data elements being aggregated in one or more buffers. For example, the write requests may be allocated across a plurality of buffers in a write cache in an attempt to use each buffer to attempt to generate complete aggregate data elements for persistent storage, while balancing other caching considerations, including the logical grouping of related data elements in the same buffers and aggregate data elements.

At block 830, the writes to persistent storage may be monitored to measure buffer usage. For example, each write to persistent storage may be quantified by the size of the aggregate data element.

At block 840, the total number of writes may be determined. For example, each persistent storage write over a given operating period may be counted. In some embodiments, this value of total writes may be determined by a total number of data commit triggers.

At block 850, the number of writes meeting a desired buffer threshold (e.g., the size of the aggregate data elements relative to the size of the buffer and/or a preferred object size of the persistent storage system) may be determined. For example, complete buffer writes may be determined by comparing each aggregate data object size to the buffer threshold or the complete writes may be determined from the count of buffer complete data commit triggers. In some embodiments, buffer threshold may be a configurable value and the buffer threshold may be set at block 855. In other embodiments, buffer threshold may be assumed to equal buffer size.

At block 860, the percentage of writes meeting the buffer threshold may be determined. For example, the number of writes meeting the buffer threshold may be divided by the total number of writes.

At block 870, the percentage of writes may be compared to a usage target to determine whether the percentage of writes is less than the usage target. For example, the usage target may be 80% and the percentage from block 860 may be 76%, resulting in the determination being true and proceeding to block 880. If the usage target has been satisfied, such as being equal to or greater than the usage target, then method 800 may end. In some embodiments, the usage target may be a configurable parameter of the system and the usage target may be set at block 875.

At block 880, an adaptation algorithm may be applied to the delay threshold used for the plurality of data write requests. For example, having determined that the usage target was not met, the adaptation algorithm may modify the value of the delay threshold for a next operating period for a plurality of data write requests. Method 800 may return to block 810 to evaluate the new delay threshold.

Figure 9:
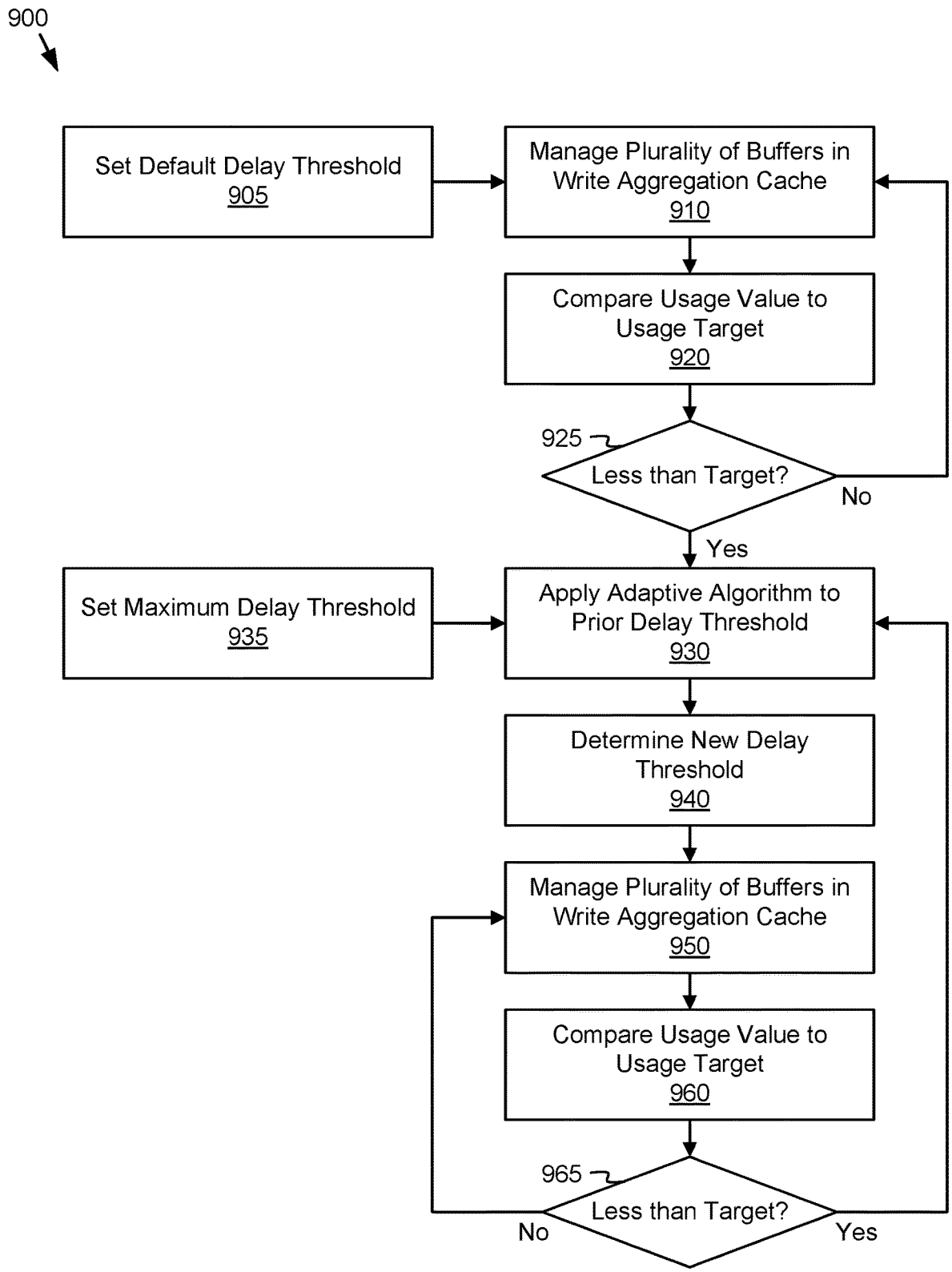
FIG. 9 illustrates an example method of adapting delay thresholds, such as may be used with the methods of FIGS. 7 and 8.

As shown in FIG. 9, in some embodiments, the access systems 630 may be further operated according to a method of adapting delay thresholds, i.e. according to the method 900 illustrated by the blocks 910-965 of FIG. 9.

At block 905, a default delay threshold may be set. For example, the default delay threshold may be defined for the system or configurable by a system administrator. In some embodiments, the default delay threshold may be one of the delay boundaries, such as the minimum delay value.

At block 910, a plurality of buffers in a write aggregation cache may be managed for a plurality of write requests. For example, as small data element writes are received, they are added to buffers that accommodate a plurality of small data elements and the delay threshold may determine how long after the first or most recent write to that buffer, the buffer remains available for additional writes before being committed to persistent storage.

At block 920, a usage value for the plurality of buffers may be compared to a usage target. For example, the number of buffers that are complete at the time of commitment to persistent storage may be compared against the number buffers that are not complete at the time of commitment and the usage target may represent the desired ratio or percentage of complete buffers committed. At block 925, if the usage value is less than the usage target, method 900 may proceed to block 930. If the usage value satisfies the usage target and is not less, then method 900 may return to block 910 and continue to manage the buffers with the default delay threshold.

At block 930, an adaptive algorithm is applied to the delay threshold used for the prior set of write operations, sometimes referred to as the current or prior delay threshold. For example, an adaptive algorithm may be applied to the prior delay threshold to increment its value according to a transfer function. In some embodiments, the adaptive algorithm may include a configurable maximum delay boundary and, at block 935, the maximum delay threshold may be set.

At block 940, a new delay threshold may be determined based on the adaptive algorithm. For example, applying the adaptive algorithm to the prior delay threshold may generate the new delay threshold according to the transfer function within selected boundary conditions.

At block 950, a plurality of buffers in write aggregation cache may be used to manage another set of write operations, similar to at block 910, using the new delay threshold. At block 960, the usage value for the next set of write operations may be compared to the usage target, similar to at block 920.

At block 965, if the usage value is less than the usage target, e.g. it does not satisfy the usage target, then method 900 may return to block 930 and continue iterating with applications of the adaptive algorithm followed by another set of write operations and comparisons. If the usage value satisfies the usage target and is no longer less than the target on any iteration, method 900 may return to block 950 and use the most recent new delay threshold to manage write operations for the buffers going forward.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
   a data cache configured to aggregate a plurality of file data requests in at least one buffer segment in the data cache; and
   a cache manager configured to:
   determine a percentage of writes to a persistent storage medium that meet a buffer threshold, wherein:
   the buffer threshold is a predetermined amount of buffer space occupied by file data in the at least one buffer segment for a write operation to the persistent storage medium;
   the at least one buffer segment has a serialized set of buffer positions;
   the file data in the at least one buffer segment includes a plurality of file block sizes from the plurality of file data requests; and
   each file block of the file data in the at least one buffer segment is assigned to at least one buffer position using a caching algorithm;
   determine, based on the percentage of writes, a delay threshold for the at least one buffer segment, wherein the delay threshold is a time value;
   monitor a commit time value for the at least one buffer segment after a first file data element is stored in the at least one buffer segment;
   determine, based on the commit time value satisfying the delay threshold, a time-based data commit trigger for the at least one buffer segment, wherein the time-based data commit trigger is set independently of a current amount of buffer space occupied by aggregate data elements in the at least one buffer segment; and
   move, responsive to a first data commit trigger, aggregate data elements from the at least one buffer segment to the persistent storage medium.

2. The system of claim 1, further comprising:
   a file server configured to manage the plurality of file data requests, wherein the plurality of file data requests are received from at least one client system using a file system protocol; and
   a persistent storage interface configured to store, responsive to the cache manager, aggregate data elements to the persistent storage medium,
   wherein:
   the aggregate data elements are from the at least one buffer segment;
   the data cache includes a plurality of buffer segments that include the at least one buffer segment;
   each buffer segment from the plurality of buffer segments has a buffer size corresponding to a predetermined persistent data element size; and
   the cache manager is further configured to:
   aggregate file data requests received by the file server in the plurality of buffer segments; and
   determine, responsive to aggregate data elements in a buffer segment exceeding the buffer threshold, a complete data commit trigger for the buffer segment, wherein the first data commit trigger is a first in time of the time-based data commit trigger and the complete data commit trigger.

3. The system of claim 1, wherein the cache manager is further configured to:
determine total writes to the persistent storage medium;
determine, among the total writes to the persistent storage medium, writes meeting the buffer threshold;
determine the percentage of writes is less than a usage target for the data cache; and
apply, responsive to determining the percentage of writes is less than the usage target, an adaptation algorithm to increase the time value for the delay threshold for the at least one buffer segment.

4. The system of claim 3, wherein the buffer threshold is based on a predetermined persistent data element size for the persistent storage medium.

5. The system of claim 1, wherein determining the delay threshold further includes:
determining a default delay threshold;
determining that the percentage of writes is less than a usage target for the data cache; and
applying, responsive to determining that the percentage of writes is less than the usage target, an adaptation algorithm to the default delay threshold to increase the time value for the delay threshold.

6. The system of claim 5, wherein increasing the time value for the delay threshold further includes:
iteratively applying, responsive to determining that the percentage of writes is less than the usage target, the adaptation algorithm to a prior delay threshold to determine the delay threshold.

7. The system of claim 6, wherein the adaptation algorithm iteratively increments the delay threshold along a curve indexed by the prior delay threshold until a maximum delay threshold is reached.

8. The system of claim 1, wherein:
the data cache includes a plurality of buffer segments, including the at least one buffer segment;
the plurality of file data requests correspond to a plurality of logical data groups;
each buffer segment from the plurality of buffer segments aggregates file data requests corresponding to one logical data group of the plurality of logical data groups; and
the cache manager is further configured to:
monitor at least one usage value for each logical data group of the plurality of logical data groups;
aggregate file data requests received by a file server in the plurality of buffer segments; and
determine, based on the at least one usage value for each logical data group of the plurality of logical data groups, a group delay threshold for each logical data group of the plurality of logical data groups, wherein determining the delay threshold for the at least one buffer segment includes selecting, based on the one logical data group corresponding to aggregate data elements in the at least one buffer segment, the delay threshold from a corresponding group delay threshold.

9. A computer-implemented method, comprising:
aggregating a plurality of data requests in at least one buffer segment in a data cache;
determining a percentage of writes to a persistent storage node that meet a buffer threshold, wherein:

the buffer threshold is a predetermined amount of buffer space occupied by file data in the at least one buffer segment for a write operation to the persistent storage node;
the at least one buffer segment has a serialized set of buffer positions;
the file data in the at least one buffer segment includes a plurality of file block sizes from the plurality of data requests; and
each file block of the file data in the at least one buffer segment is assigned to at least one buffer position using a caching algorithm;
determining, based on the percentage of writes, a delay threshold for the at least one buffer segment, wherein the delay threshold is a time value;
monitoring a commit time value for the at least one buffer segment after a first data element is stored in the at least one buffer segment;
determining, based on the commit time value satisfying the delay threshold, a time-based data commit trigger for the at least one buffer segment, wherein the time-based data commit trigger is set independently of a current amount of buffer space occupied by aggregate data elements in the at least one buffer segment; and
moving, responsive to a first data commit trigger, aggregate data elements from the at least one buffer segment to the persistent storage node.

10. The computer-implemented method of claim 9, further comprising:
managing the plurality of data requests, wherein:
the plurality of data requests are received from at least one client system using a file system protocol;
the persistent storage node has a predetermined persistent data element size;
the data cache includes a plurality of buffer segments that include the at least one buffer segment; and
each buffer segment from the plurality of buffer segments has a buffer size corresponding to the predetermined persistent data element size;
aggregating data requests in the plurality of buffer segments; and
determining, responsive to aggregate data elements in a buffer segment exceeding the buffer threshold, a complete data commit trigger for the buffer segment, wherein the first data commit trigger is a first in time of the time-based data commit trigger and the complete data commit trigger.

11. The computer-implemented method of claim 9, further comprising:
determining total writes to the persistent storage node;
determining, among the total writes to the persistent storage node, writes meeting the buffer threshold;
determining the percentage of writes is less than a usage target for the data cache; and
applying, responsive to determining the percentage of writes is less than the usage target, an adaptation algorithm to increase the time value for the delay threshold for the at least one buffer segment.

12. The computer-implemented method of claim 11, wherein the buffer threshold is based on a predetermined persistent data element size for the persistent storage node.

13. The computer-implemented method of claim 9, further comprising:
determining a default delay threshold;
determining that the percentage of writes is less than a usage target for the data cache; and applying, responsive to determining that the percentage of writes is less than the usage target, an adaptation algorithm to the default delay threshold to increase the time value for the delay threshold.

14. The computer-implemented method of claim 13, further comprising:
iteratively applying, responsive to determining that the percentage of writes is less than the usage target, the adaptation algorithm to a prior delay threshold to determine the delay threshold.

15. The computer-implemented method of claim 14, wherein the adaptation algorithm iteratively increments the delay threshold along a curve indexed by the prior delay threshold until a maximum delay threshold is reached.

16. The computer-implemented method of claim 9, wherein:
the data cache includes a plurality of buffer segments, including the at least one buffer segment;
the plurality of data requests correspond to a plurality of logical data groups;
each buffer segment from the plurality of buffer segments aggregates file data requests corresponding to one logical data group of the plurality of logical data groups; and
further comprising:
monitoring at least one usage value for each logical data group of the plurality of logical data groups;
aggregating data requests in the plurality of buffer segments; and
determining, based on the at least one usage value for each logical data group of the plurality of logical data groups, a group delay threshold for each logical data group of the plurality of logical data groups, wherein determining the delay threshold for the at least one buffer segment includes selecting, based on the one logical data group corresponding to aggregate data elements in the at least one buffer segment, the delay threshold from a corresponding group delay threshold.

17. A system, comprising:
a data cache configured to aggregate a plurality of data requests in at least one buffer segment in the data cache;
a storage node configured to store aggregate data elements from the data cache in a persistent storage medium;
means for determining a percentage of writes to the persistent storage medium that meet a buffer threshold, wherein:
the buffer threshold is a predetermined amount of buffer space occupied by file data in the at least one buffer segment for a write operation to the persistent storage medium;
the at least one buffer segment has a serialized set of buffer positions;
the file data in the at least one buffer segment includes a plurality of file block sizes from the plurality of data requests; and
each file block of the file data in the at least one buffer segment is assigned to at least one buffer position using a caching algorithm;
means for determining, based on the percentage of writes, a delay threshold for the at least one buffer segment, wherein the delay threshold is a time value;
means for monitoring a commit time value for the at least one buffer segment after a first write request stores a first data element in the at least one buffer segment;
means for determining, based on the commit time value satisfying the delay threshold, a time-based data commit trigger for the at least one buffer segment, wherein the time-based data commit trigger is set independently of a current amount of buffer space occupied by aggregate data elements in the at least one buffer segment; and
means for moving, responsive to a first data commit trigger, aggregate data elements from the at least one buffer segment to the persistent storage medium.

18. The system of claim 17, further comprising:
means for determining total writes to the persistent storage medium;
means for determining, among the total writes to the persistent storage medium, writes meeting the buffer threshold;
means for determining the percentage of writes is less than a usage target for the data cache, wherein the buffer threshold is based on a predetermined persistent data element size for the storage node; and
means for applying, responsive to determining the percentage of writes is less than the usage target, an adaptation algorithm to increase the time value for the delay threshold for the at least one buffer segment.

19. The system of claim 17, wherein the means for determining the delay threshold is configured to:
determine a default delay threshold;
determine that the percentage of writes is less than a usage target; and
apply, responsive to determining that the percentage of writes is less than the usage target, an adaptation algorithm to the default delay threshold to increase the time value for the delay threshold.

20. The system of claim 19, wherein the means for determining the delay threshold is further configured to:
iteratively apply, responsive to determining that the percentage of writes is less than the usage target, the adaptation algorithm to a prior delay threshold to determine the delay threshold.

* * * * *